3,325,471
2,4-DINITROPHENYL-AZO - 2 - ALKANOYLAMINO-
5 - ALKOXY - BIS (β - CYANOETHOXYETHYL)-
BENZENE DYESTUFFS
Paul Rhyner, Basel, and Klaus Artz, Muttenz, Switzerland, assignors to Ciba Limited, Basel, Switzerland, a company of Switzerland
No Drawing. Filed Jan. 3, 1966, Ser. No. 517,934
Claims priority, application Switzerland, Dec. 14, 1961, 14,512/61
7 Claims. (Cl. 260—207)

This is a continuation-in-part application of our copending application Ser. No. 242,928, filed Dec. 7, 1962, and now abandoned.

The present invention provides valuable new water-insoluble monoazo dyestuffs of the formula

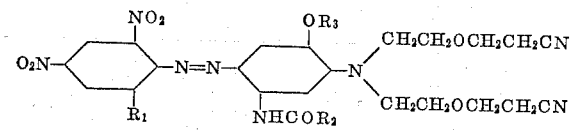

in which $R_1$ stands for hydrogen, chlorine, bromine or lower alkyl, $R_2$ and $R_3$ for lower alkyl.

The new dyestuffs are obtained when the diazo compound of an amine of the formula

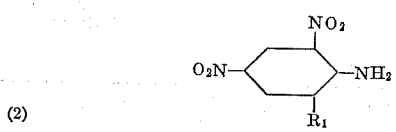

(2)

is coupled with a diazo component of the formula (3)
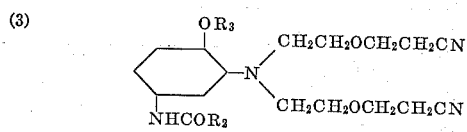

in which formulae $R_1$ to $R_3$ have the above meanings.

As examples of suitable diazo components there may be mentioned the following amines:

2:4-dinitraniline, 2:4-dinitro-6-chlor- or -6-bromaniline, 2:4-dinitro-6-methylaniline.

In the amines of the Formula 3, which are to be used as coupling component, $R_2$ may represent a lower alkyl group, being for instance a methyl, ethyl, propyl or butyl group. $R_3$ also stands for a lower alkyl group for example a methyl or ethyl group.

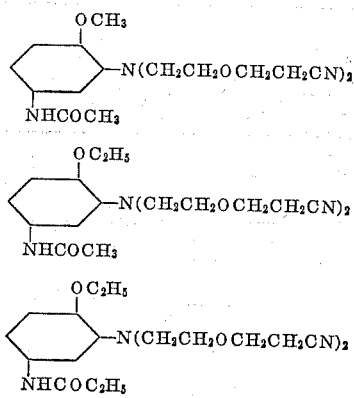

The coupling components shown above may be prepared by adding 2 molecular proportions of acrylonitrile on to a suitable hydroxyethylaniline.

The diazotization of the aforesaid diazo components can follow the usual practice and consists, for example, in the reaction with a mineral acid, more especially hydrochloric acid, and sodium nitrite, or, for example, with a solution of nitrosylsulfuric acid in concentrated sulfuric acid.

Coupling may likewise be carried out in known manner, for example in a neutral to acidic medium, if desired in the presence of sodium acetate or of a similar buffer substance capable of influencing the coupling speed, or of a catalyst, such, for example, as pyridine or a pyridine salt.

On completion of the coupling reaction the dyestuffs formed can be separated, for example filtered off, from the coupling mixture because they are substantially insoluble in water.

Instead of a unitary coupling component there may be used a mixture of two or several of the coupling components proposed for use in the present invention.

According to another method a mixture of coupling components that differ only insofar as the acyl residue $R_2CO$ is concerned, with a unitary diazo component as defined, or a mixture of diazo components that differ insofar as one of the substituents is concerned, with a unitary coupling component, is coupled. Finally, dyestuff mixtures are also obtained when dyestuffs obtained by the present process are subsequently mixed together.

After having been converted into a finely dispersed form the new monoazo dyestuffs are excellently suitable for dyeing synthetic fibers, more especially fibers from aromatic polyesters. The resulting deep red to greenish blue dyeings display good fastness to light and sublimation. The new dyestuffs are further distinguished by good wool immunization.

Compared with the dyestuffs described in French specification No. 1,261,580 the dyestuffs obtained according to this invention are distinguished by the fact that they dye polyester fibers readily also from alkaline dyebaths, and in addition they produce dyeings of better fastness to light and wool immunization. Compared with the best comparable dyestuff disclosed in Patent No. 2,083,308 applicants' dyes show the surprising beneficial properties in having a better fastness to light and a better wool immunization. Compared with the best comparable dyestuff disclosed in Austrian Patent No. 204,665, applicants' dyes show the beneficial property in having a better fastness to sublimation.

The following examples illustrate the invention; unless otherwise indicated, the parts and percentages are by weight.

Example 1

2.2 parts of 2:4-dinitro-6-chloraniline are added at 0 to 5° C. to a solution of 0.7 part of sodium nitrite in 20 parts of concentrated sulfuric acid; the whole is stirred for 1 hour at the same temperature and then poured into a solution of 3.8 parts of 3-acetamino-6-methoxy-N:N-bis(β-cyanethoxyethyl)aniline in 50 parts of glacial acetic acid. The dyestuff of the formula

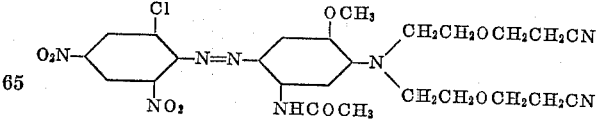

precipitates on addition of a staturated sodium acetate solution and a small amount of ice and is suctioned off. From an aqueous dispersion this dyestuff produces on polyester fibers dyeings having good fastness properties.

*Example 2*

2.6 parts of 2:4-dinitro-6-bromaniline are added at 0 to 5° C. to a solution of 0.7 part of sodium nitrite in 20 parts of concentrated sulfuric acid; the batch is stirred for 1 hour at the same temperature and then poured over ice. This diazo solution is added to a solution of 3.7 parts of 3 - acetamino - 6 - methoxy - N:N - bis - (β - cyanethoxy - ethyl)-aniline in 50 parts of 2 N-hydrochloric acid. On addition of sodium acetate the dyestuff precipitates quantitatively and is filtered off. It corresponds to the formula

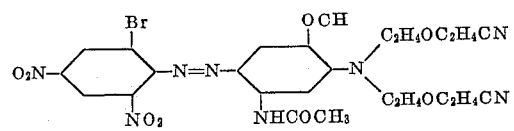

and dyes polyester fibers from an aqueous dispersion blue tints that are fast to light and sublimation.

In Column I of the following table there are listed several further diazo components which, on being diazotised as described in this example and then coupled with the coupling components shown in Column II, yield dyestuffs that dye polyester fibers the tints shown in Column III:

| No. | I<br>Diazo component | II<br>Coupling component | III<br>Tint |
|---|---|---|---|
| 1 | $O_2N-\langle\rangle-NH_2$, $NO_2$ | $OCH_3$, $C_2H_4OC_2H_4CN$, $C_2H_4OC_2H_4CN$, $NHCOCH_3$ | Blue. |
| 2 | $O_2N-\langle\rangle-NH_2$, $CH_3$, $NO_2$ | $OCH_3$, $C_2H_4OC_2H_4CN$, $C_2H_4OC_2H_4CN$, $NHCOCH_3$ | Blue. |
| 3 | $O_2N-\langle\rangle-NH_2$, $C_2H_5$, $NO_2$ | $OCH_3$, $C_2H_4OC_2H_4CN$, $C_2H_4OC_2H_4CN$, $NHCOCH_2CH_3$ | Blue. |
| 4 | $O_2N-\langle\rangle-NH_2$, $Cl$, $NO_2$ | $OCH_3$, $C_2H_4OC_2H_4CN$, $C_2H_4OC_2H_4CN$, $NHCOC_2H_5$ | Blue. |
| 5 | $O_2N-\langle\rangle-NH_2$, $Cl$, $NO_2$ | $OCH_3$, $C_2H_4OC_2H_4CN$, $C_2H_4OC_2H_4CN$, $NHCO(CH_2)_2CH_3$ | Blue. |
| 6 | 1 Mol $O_2N-\langle\rangle-NH_2$, $Cl$, $NO_2$ + 1 Mol $O_2N-\langle\rangle-NH_2$, $NO_2$ | 2 Mol $OCH_3$, $C_2H_4OC_2H_4CN$, $C_2H_4OC_2H_4CN$, $NHCOCH_3$ | Blue. |
| 7 | $O_2N-\langle\rangle-NH_2$, $NO_2$ | $OC_2H_5$, $C_2H_4OC_2H_4CN$, $C_2H_4OC_2H_4CN$, $NHCOCH_3$ | Blue. |
| 8 | 2 Mol $O_2N-\langle\rangle-NH_2$, $NO_2$ | 1 Mol $OCH_3$, $C_2H_4OC_2H_4CN$, $C_2H_4OC_2H_4CN$, $NHCOCH_3$ + Mol $OCH_3$, $C_2H_4OC_2H_4CN$, $C_2H_4OC_2H_4CN$, $NHCOCH_2-CH_3$ | Blue. |

Example 3

1 part of an aqueous paste of the dyestuff obtained in Example 1 is ground with about 1 part of dried sulfite cellulose waste liquor in a roller mill to form a smooth paste containing about 10% of dyestuff.

100 parts of polyethylene terephthalate fibers are first cleaned for ½-hour in a bath containing per 1000 parts of water 1 to 2 parts of the sodium salt of N-benzyl-μ-heptadexyl-benzimidazole-disulfonic acid and 1 part of concentrated aqueous ammonia solution. The fibrous material is then immersed in a dyebath containing in 3000 parts of water 1.5 parts by volume of acetic acid of 80% strength in which 10 parts of the dyestuff paste described in the first paragraph above, mixed with 54 parts of the sodium salt of N-benzyl-μ-heptadecylbenzimidazole-disulfonic acid, have been dispersed. The whole is heated in an autoclave to 130° C. and then kept for 1 hour at this temperature. The material is then thoroughly rinsed and, if necessary, washed for half an hour at 60 to 80° C. with a solution containing in 1000 parts of water 1 part of the sodium salt of N-benzyl-μ-heptadecylbenzimidazole-disulfonic acid. The resulting blue dyeing displays good properties of fastness.

What is claimed is:

1. Monoazo dyestuffs of the formula

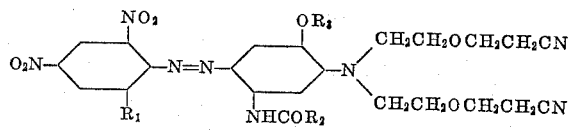

in which $R_1$ represents a member selected from the group consisting of hydrogen, chlorine, bromine and lower alkyl, $R_2$ and $R_3$ represent lower alkyl.

2. The dyestuff as claimed in claim 1 of the formula

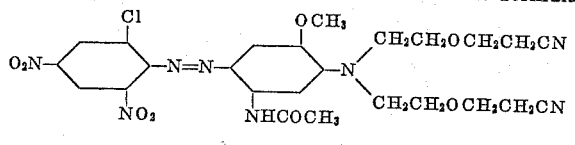

3. The dyestuff as claimed in claim 1 of the formula

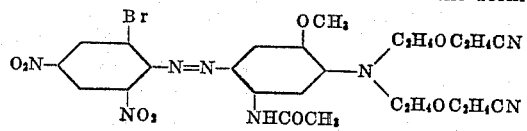

4. The dyestuff as claimed in claim 1 of the formula

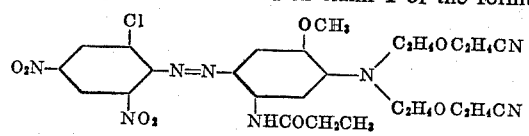

5. The dyestuff as claimed in claim 1 of the formula

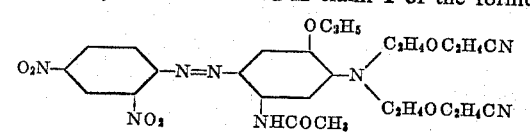

6. The dyestuff as claimed in claim 1 of the formula

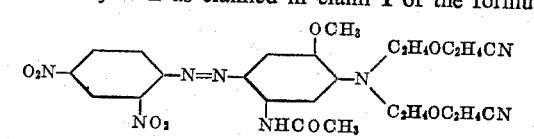

7. The dyestuff as claimed in claim 1 of the formula

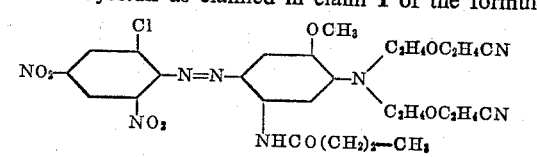

References Cited

UNITED STATES PATENTS 2,941,992  6/1960  Rhyner et al. _____ 260—207 X

CHARLES B. PARKER, *Primary Examiner.*

F. D. HIGEL, *Assistant Examiner.*